US012710560B2

(12) United States Patent
Demitri et al.

(10) Patent No.: US 12,710,560 B2
(45) Date of Patent: Aug. 18, 2026

(54) SYSTEM AND METHOD SMART STAND-ALONE MULTI-SENSOR GATEWAY FOR DETECTION OF PERSON-BORNE THREATS

(71) Applicant: Xtract OneTechnologies, Toronto (CA)

(72) Inventors: Nevine Demitri, Toronto (CA); Munir Ahmad Tarar, Toronto (CA); James Allan Douglas Cameron, Fredericton (CA); Jonathan Taylor Millar, Toronto (CA)

(73) Assignee: XTRACT ONE TECHNOLOGIES INC., Toronto (CA)

( * ) Notice: Subject to any disclaimer, the term of this patent is extended or adjusted under 35 U.S.C. 154(b) by 705 days.

(21) Appl. No.: 18/093,937

(22) Filed: Jan. 6, 2023

(65) Prior Publication Data

US 2023/0213678 A1 Jul. 6, 2023

Related U.S. Application Data

(60) Provisional application No. 63/297,024, filed on Jan. 6, 2022.

(51) Int. Cl.
*G01V 3/08* (2006.01)

(52) U.S. Cl.
CPC .................................. *G01V 3/081* (2013.01)

(58) Field of Classification Search
None
See application file for complete search history.

(56) References Cited

U.S. PATENT DOCUMENTS

2019/0236791 A1* 8/2019 Matsui .................... G06T 7/254
2021/0287013 A1* 9/2021 Carter .................... H04N 7/181
2022/0334243 A1* 10/2022 DeAngelus .......... G06V 10/454

* cited by examiner

*Primary Examiner* — Tung X Nguyen

(57) ABSTRACT

A system and method for a smart stand-alone multi-sensor gateway for detection of person-borne threats. The multi-sensor gateway system consists of two pillars comprising a plurality of sensors that build a gateway for patrons to pass through that detects concealed threats carried on-body. The threat detection relies on artificial intelligence (AI) to analyze the sensors' data and assess the presence of a threat. The AI is performed on an edge device contained within the gateway. The gateway can consist of a plurality of peripherals that enhance the sensing capability of the gateway, such as a camera or an accelerometer, and provide the security guard with information around alerts and threat locations such as with displays or audible alerts and manage the operations such as displays to control throughput.

21 Claims, 13 Drawing Sheets

SYSTEM AND METHOD SMART STAND-ALONE MULTI-SENSOR GATEWAY FOR DETECTION OF PERSON-BORNE THREATS

CROSS REFERENCE TO RELATED APPLICATIONS

The application claims priority to and the benefit of U.S. Provisional Application Ser. No. 63/297,024, entitled "SYSTEM AND METHOD SMART STAND-ALONE MULTI-SENSOR GATEWAY FOR DETECTION OF PERSON-BORNE THREATS", filed on Jan. 6, 2022, the disclosure of which is incorporated herein by reference in its entirety.

BACKGROUND

The embodiments described herein relate to security and surveillance, in particular, technologies related to video recognition threat detection.

In previous threat detection gateway systems that rely on artificial intelligence (AI) to detect the presence of a threat, the computing has been performed on a server located within the facility, connected to the system by an Ethernet connection. This has required a dependence on the facility network, causing a high latency to deliver alert information. This also provides a single point of failure that would simultaneously affect all entry systems should the server encounter an issue or should there be network connectivity problems encountered.

Typically, the alert information was shown on a user interface (UI) on a separate laptop or tablet computer. The network delay introduced causes confusion in high throughput situations where the security guard has to manage the high ingress rate, and simultaneously check the laptop/tablet for alert information. This causes inefficient screening and reduces the security factor provided by threat detection gateways. Furthermore, in high throughput situations, patrons typically walk into the gateway in groups and do not follow the concept of operations that the system was designed for. This results in a high number of false positives and false alerts.

There is a desire to implement a system and method for embedding AI computing within the detection gateway systems themselves to eliminate the dependence on customer networks and remote servers, and to reduce or eliminate false alerts via improved communication of the concept of operations to the patron.

SUMMARY

A system and method for a smart stand-alone multi-sensor gateway for detection of person-borne threats. The multi-sensor gateway system consists of two pillars comprising a plurality of sensors that build a gateway for patrons to pass through that detects concealed threats carried on-body. The threat detection relies on artificial intelligence (AI) to analyze the sensors' data and assess the presence of a threat. The AI is performed on an edge device contained within the gateway. The gateway can consist of a plurality of peripherals that enhance the sensing capability of the gateway, such as a camera, or an accelerometer and provide the security guard with information around alerts and threat locations such as with displays or audible alerts and manage the operations such as displays to control throughput.

DETAILED DESCRIPTION

Embodiments of this disclosure includes a system that places the computing at the edge by including an onboard processor. Further, different peripherals are added to present the alert information to the security guard, control the throughput rate and operations. This system benefits the patron experience and provides added value to the customer in terms of managing throughput and enhancing security.

Figure 1A:
FIGS. 1A to 1D are diagrams illustrating an exemplary gateway detection system.
Figure 1B:
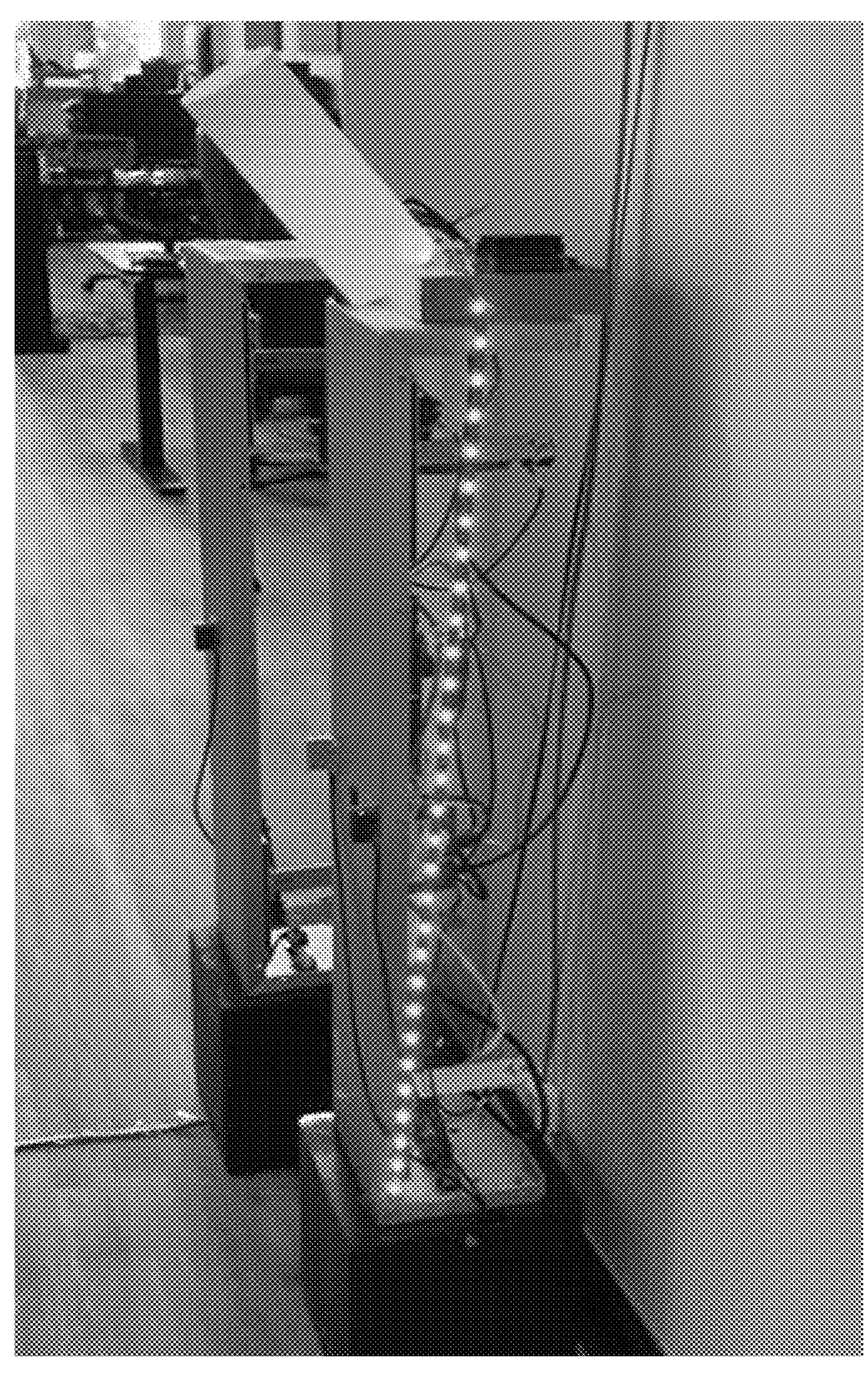
Figure 1C:
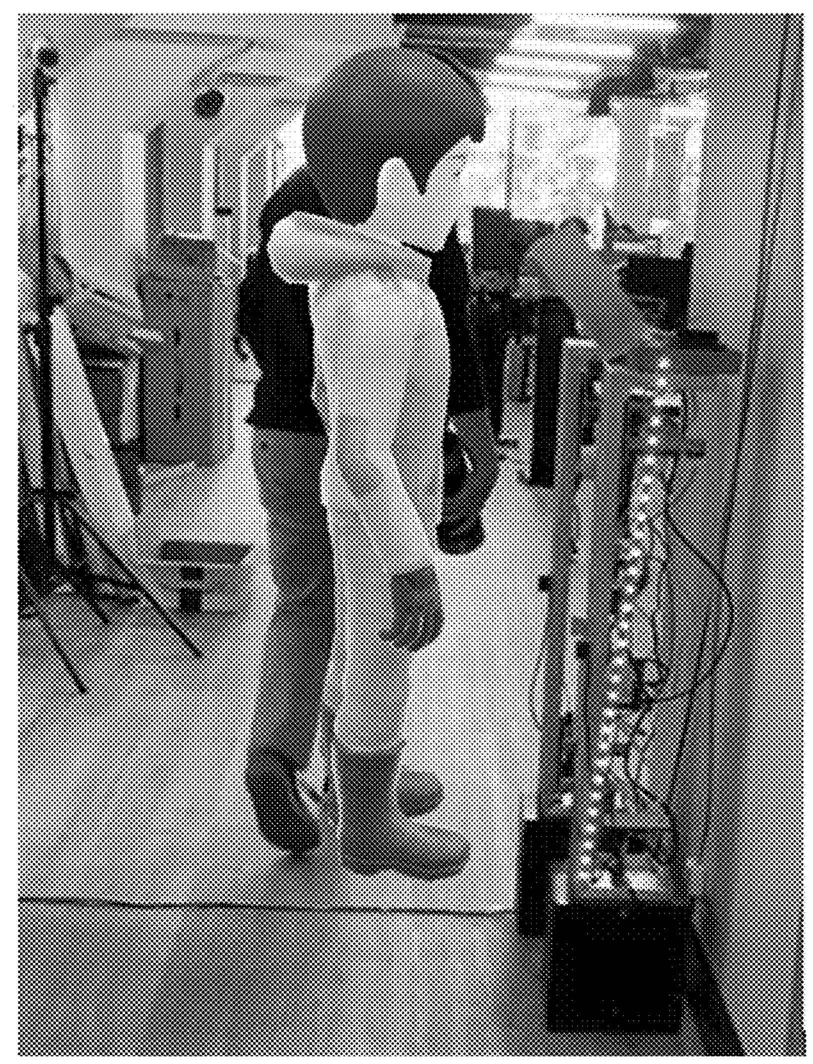
Figure 1D:

FIGS. 1A to 1D are diagrams illustrating an exemplary gateway detection system. According to FIG. 1A, a gateway detection system is shown where the light changes color to red when a person moves through it. FIG. 1B is a close-up of the gateway detection system showing a top light and a chain of LED vertical light. FIG. 1C and FIG. 1D are diagrams of the gateway detection system showing the lights (top light and vertical LED chain) turning red when a person passes with an object. The object may include a concealed weapon. In further embodiments, the light changes to red only if there is a threat on-body, otherwise the light turns green showing that the patron has no threat.

Figure 2:
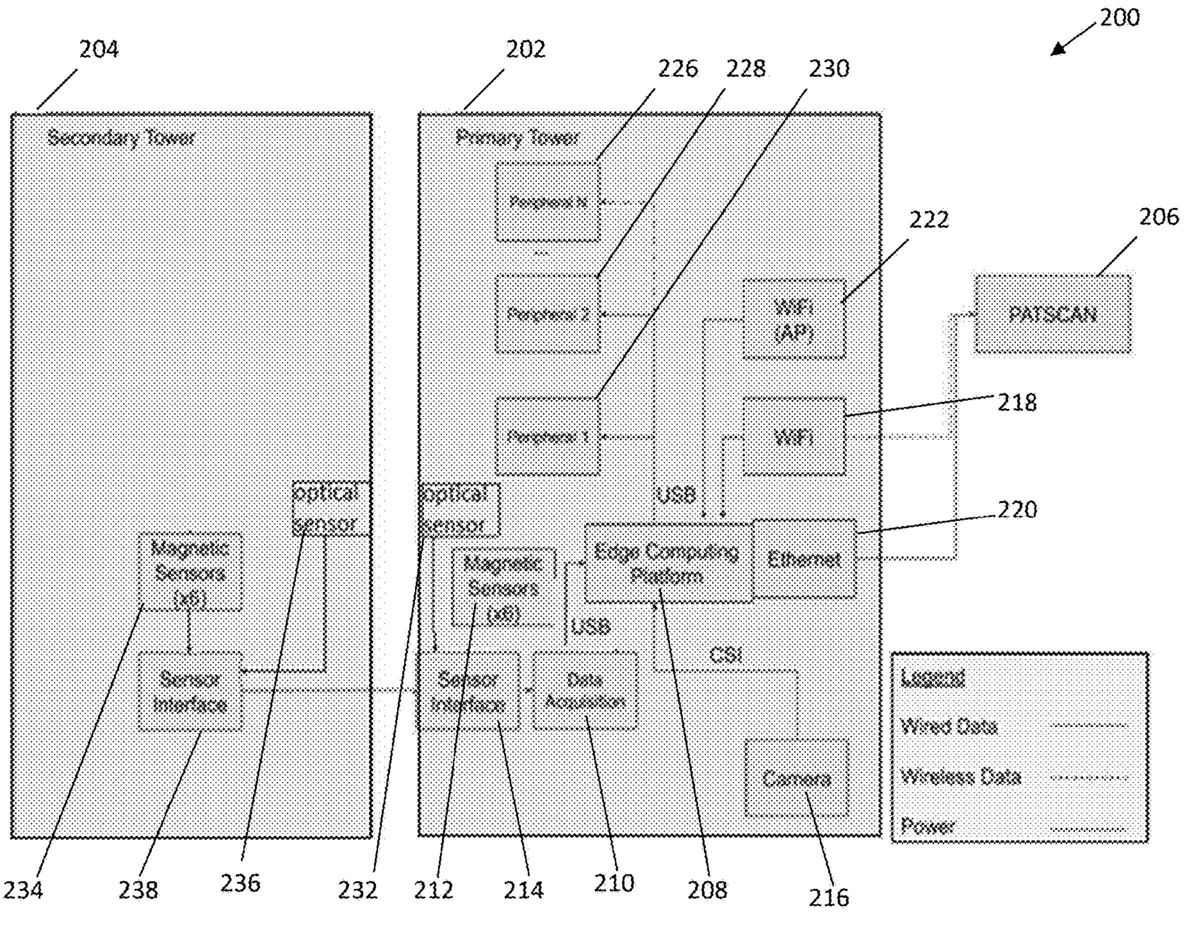
FIG. 2 is a block diagram illustrating a gateway detection system.

FIG. 2 is a block diagram illustrating a gateway detection system. According to FIG. 2, the gateway detection system 200 consists of a primary tower 202, a secondary tower 204 and a threat detection system such as PATSCAN 206, connected to each other either through a wired or wireless connection. The primary tower 202 consists of the main components of the system including an Edge computing platform 208, data acquisition unit 210, multiple magnetic sensors 212, sensor interfaces 214, one or more cameras 214, a Wi-Fi® module 218 and Ethernet module 220 for connectivity, Wi-Fi® access point 222 and connections to multiple peripherals 226, 228 and 230. The peripherals include optical sensors 232, camera(s), display(s), light(s), speaker(s), accelerometer, Wi-Fi® and Bluetooth units. The secondary tower 204 includes multipole magnetic sensors 234, optical sensor 236 and sensor interface 238 and is connected to the primary tower by a wired data link (e.g., Ethernet). In further embodiments, a wireless connection such as Wi-Fi®, Bluetooth®, IRDA, cellular or other wireless connectivity mediums may be supported.

According to the disclosure, a multi-sensor threat detection system may contain an onboard processor (e.g., Nvidia Jetson) that performs the artificial intelligence (AI) to detect the presence of a threat. This removes the need for network dependence on the deployment facility, thereby strongly facilitating the deployment. The onboard processor also reduces the latency of alert, when compared to performing the AI on a server. This results in a smoother screening experience, as the alert latency can handle the high through-put rates. This also removes the reliance on an external server which acted as a single point of failure across all connected systems previously.

The disclosure also contains multiple peripheral components that assist with alerting and control of operations. A camera is used to capture the patron that has alerted and to present evidence to the security guard to help with secondary screening. This assists the security guard in identifying the corresponding threat detection with the patron. Further, the system contains an alert indicator display that indicates an alert and shows the threat location on-body, as well as possibly the image of the alerting patron. There is also an audible signal to indicate an alert. These peripherals all work to enable the security guard to quickly take decisions on patrons entering the facility with prohibited items in high throughput use cases, such as stadiums or event venues.

According to FIG. 2, the system has onboard Wi-Fi®, as well as Ethernet, to connect to a web browser to provide more analytics to the user via a user interface. Furthermore, to enhance the stand-alone capability of the system wheels are added for better portability. Also a baseplate is added for better physical stability of the system against vibrations and tipping hazards.

To further help with control of operations, a display is placed on the patron side educating the patrons on how to walk through the system, and what distance to keep from the patron ahead. Furthermore, a backup option is provided for connecting the gateway system over Ethernet to the software platform for control and upgrades of the system algorithms and operations remotely.

Figure 3:
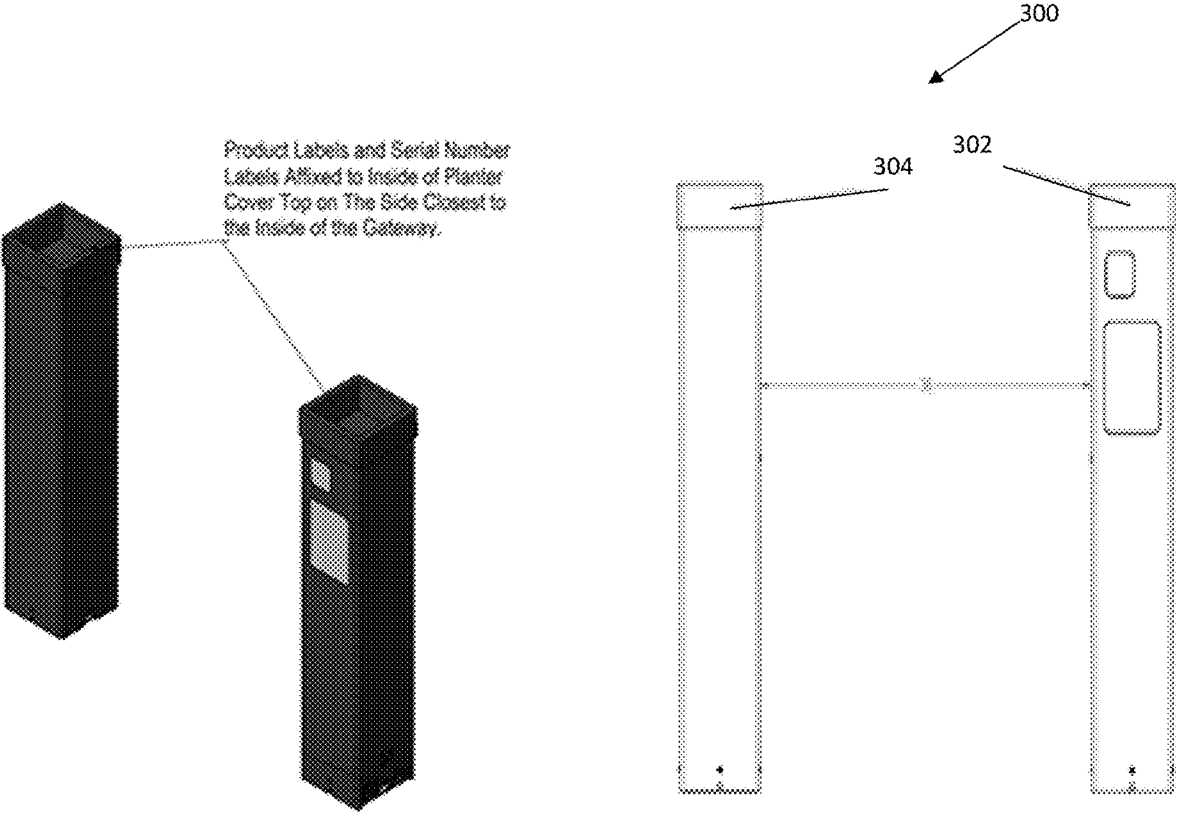
FIG. 3 is a diagram of assembly of a gateway detection system.

FIG. 3 is a diagram of assembly of a gateway detection system. According to FIG. 3, a gateway detection system 300 such as SmartGateway is shown to be 36" apart and consists of right pillar 302 and left pillar 304. Product labels and serial number labels may be affixed to the inside of the cover top on the side closest to the inside of the gateway. Pillars 302 and 304 can be disguised as planter covers, posts or other objections or structures.

According to FIG. 3, gateway detection system 300 such as SmartGateway delivers fast, reliable and accurate patron screening for high through-put venues, replacing intimidating metal detectors. This solution unobtrusively scans patrons for guns, knives and other prohibited items as they enter a facility. Gateway detection system 300 uses artificial intelligence (AI) powered sensors to detect threats without invading the privacy and comfort of patrons. Furthermore, the system is ideal for stadiums and other ticketed venues that need to get thousands of people in quickly, safely and in alignment with security standards requirements.

According to the disclosure, the gateway detection system consists of a multi-sensor Gateway (MSG), an artificial intelligence (AI) powered walk-through metal detector (WTMD) for screening of people requiring minimal divestment of personal belongings. The technology uses extremely low frequency (ELF), passive, electromagnetic sensors in conjunction with a software platform to detect concealed ferrous metallic items. The technology assists operators in detecting and locating weapons on persons, such as metallic firearms and knives.

The Technology is designed for use in high throughput security screening environments that allow for low to medium clutter, such as those seen in sports arenas and stadiums, manufacturing facilities, gaming, and entertainment venues, and more. For optimal performance, divestment of large items such as backpacks, briefcases, large purses, and suitcases by patrons (or attendees or events), which may contain heavy clutter and lead to higher alert rates, is recommended.

The Technology may be configured to accommodate many concepts of operations (CONOPS) to meet the throughput and security requirements of a given customer or deployment location. Patrons may pass through the Multi-Sensor Gateway, at a pace ranging from 0.5 to 1.5 meters per second without stopping, and without having to divest non-threatening everyday carry (EDC) items such as wallets, phones, keys, watches, and headphones. The Technology may be deployed as one independent Gateway unit or as a fleet of units.

The Technology utilizes a passive magnetic detection and discrimination system which comprises two pillars, each equipped with two magnetic inductive sensors mounted on a rigid framework. Each pillar is also equipped with a permanent magnet assembly comprised of 20 neodymium magnets, which produce a static (DC) magnetic field. This field magnetizes metallic objects as they pass through the screening area, defined as the space between the two pillars where persons traverse. The ensemble of magnetic inductive sensors and neodymium magnets, in concert with the computing resources outlined herein, are configured to respond to amplitude waveform data created by magnetized objects passing through the screening area. The amplitude waveform data is ingested and processed by the Software Platform, which hosts the Machine Learning (ML) models used to detect and classify the magnetized objects.

The Technology consists of the following:

Multi-Sensor Gateway (MSG): Two pillars each containing two passive, 0.3- to 1-Hz ELF, electromagnetic sensors for the detection of ferrous threat objects. Each gateway system is equipped with one optical camera to capture video imagery of individuals as they are screened. The pillars may be installed permanently or mounted on wheeled base plates that allow for rapid setup, tear down, easy maneuvering, and relocation. The MSG system is currently available in two configurations-SafeGateway and SmartGateway—as described further below.

Artificial Intelligence (AI) Software Platform ("the Platform"): AI-analytics software that provides data collection capabilities and classification of detected objects. Depending on network configuration, the Platform may receive inputs from one or more (i.e., one-to-many) MSGs.

The Platform is equipped with a graphical user interface (GUI) that displays:

- Screening results for interpretation and action by the user (i.e., threat detection results).
- A human avatar illustrating the location of a detected threat object; and
- An image, extracted from live video feed, of the patron walking through the Gateway upon threat detection.

The Platform allows users to adjust settings such as sensitivity and distances between pillars to meet required CONOPS, such as traffic patterns and anticipated on-person clutter. In concert, the Platform and MSG provide the ability for the system to detect ferrous-based threats including long guns, handguns, and larger knives and distinguish them from benign objects like cell phones and keys.

The Multi-Sensor Gateway is available in two different configurations—SafeGateway and SmartGateway—to tailor to customer business and operational requirements. Both configurations use the same underlying MSG and AI Software Platform science & technology and have equivalent threat detection performance.

SafeGateway: The SafeGateway configuration consists of MSG(s) available in single system or fleet configurations. The SafeGateway uses a provided Server installed on premises. This is a third-party, networked server that hosts the Platform, aggregates, and stores data collected from one or more MSGs. Each MSG is connected to the Server through a Local Area Network (LAN) and is powered through Power over Ethernet (PoE). Alerts are provided to the end user on a touchscreen kiosk (tablet) or desktop client connected through the same LAN. The SafeGateway may use either customer-supplied cameras, or the integrated kiosk camera.

SmartGateway: The SmartGateway configuration moves the Platform, and all computational components onboard the MSG pillars and incorporates an integrated camera. An onboard screen used to direct patron traffic is located on the front of the main pillar, and another screen located on the back serves as the threat indicator screen for security personnel. SmartGateway also includes audio alert functionality for overt threat detection operations. Compared to SafeGateway, the SmartGateway provides customers with a more portable, standalone solution, while providing the same underlying threat detection technology and performance. Each SmartGateway unit (deployed as a pair of pillars) requires one 120V power source.

Figure 4:
FIG. 4 is a diagram of illustrating a SafeGateway with kiosk system.
Figure 4:
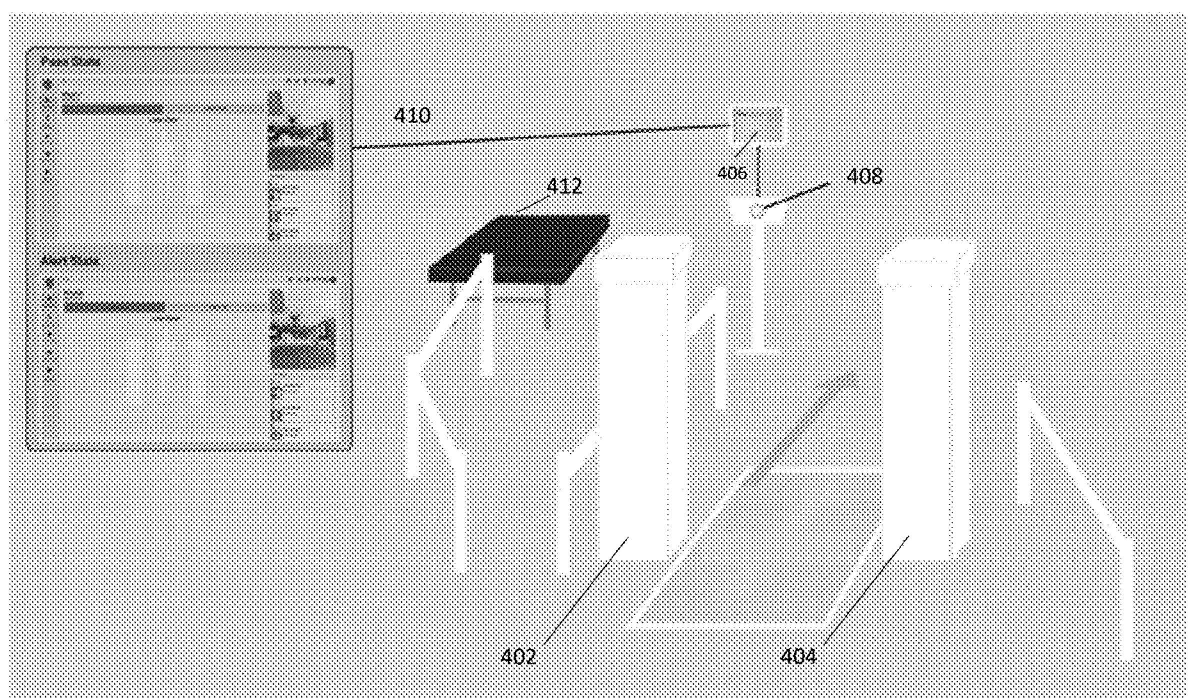

FIG. 4 is a diagram illustrating a SafeGateway with kiosk system. According to FIG. 4, the SafeGateway system 400 consists of two pillars 402, 404 where patrons/people will enter (i.e., in direction of arrow). Directly past the pillars is a screening kiosk 406 consisting of a camera 408 and a tablet which displays the Pass and Alert states 410. Close by would be a divestment table 412 where security personnel may search objects of the patron (e.g., backpack, handbag, laptop bags, etc.).

Figure 5:
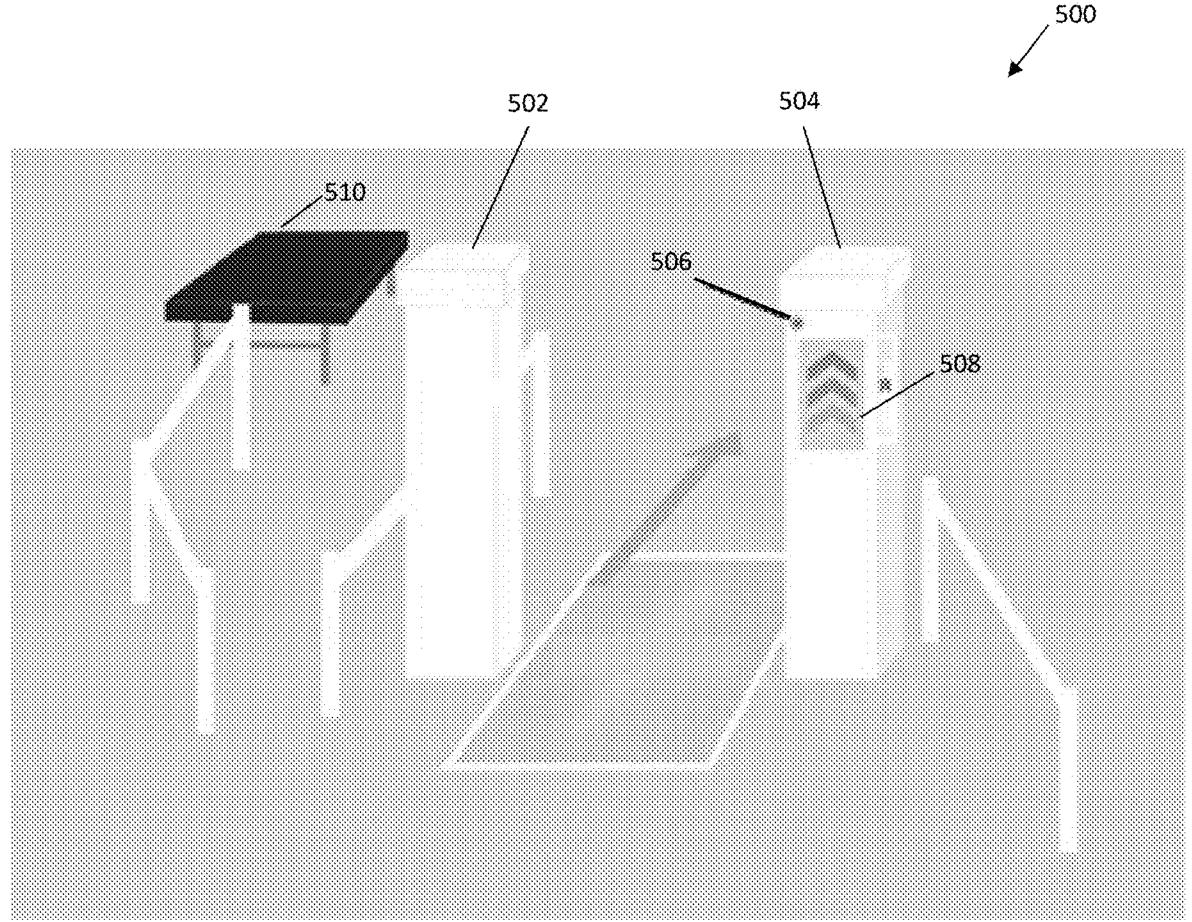
FIG. 5 is a diagram of illustrating a standalone SmartGateway system.

FIG. 5 is a diagram illustrating a standalone SmartGateway system. According to FIG. 5 the standalone SmartGateway system 500 consists of two pillars 502, 504 of a threat detection system 500. One of these pillars will have an integrated camera 506, a display screen 508 and a guard screen (not shown). There may also be arrows to indicate direction of traffic flow. Close by would be a divestment table 510 where security personnel may search objects of the patron (e.g., backpack, handbag, laptop bags, etc.).

Figure 6:
FIG. 6 is a diagram of illustrating a SmartGateway system with a screening client.
Figure 6:
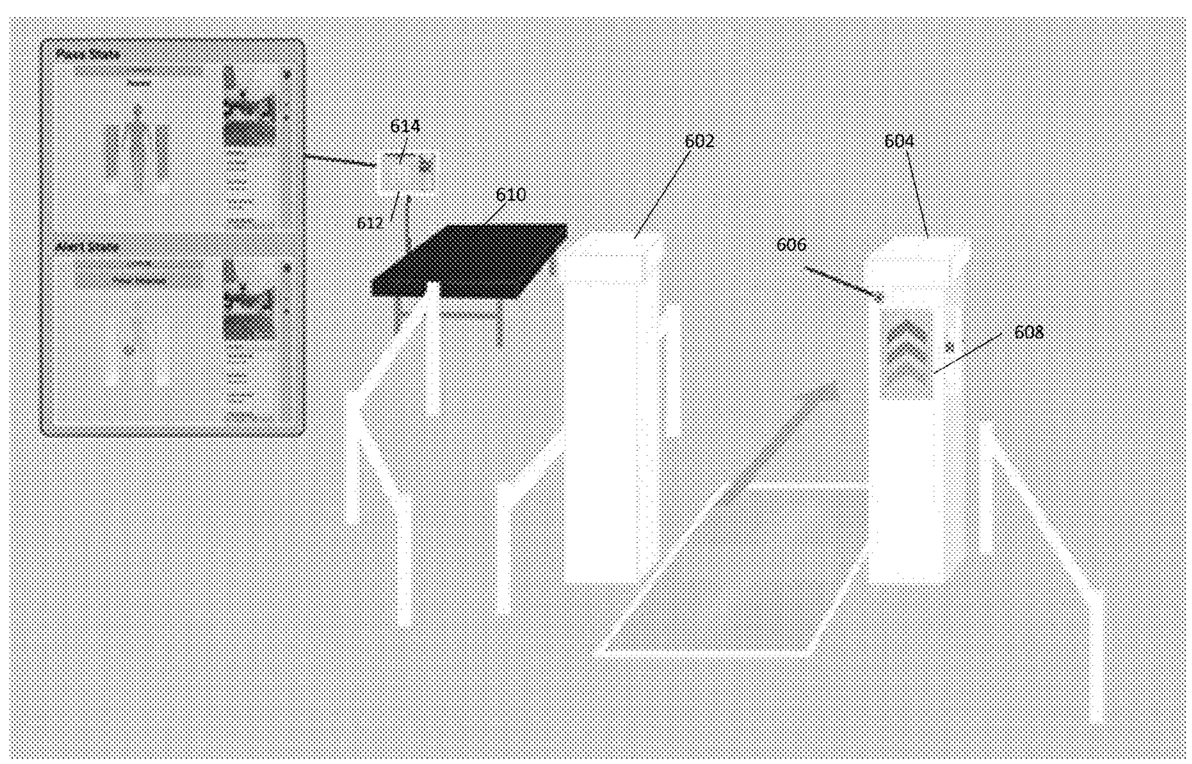

FIG. 6 is a diagram illustrating a SmartGateway system with a screening client. According to FIG. 6, a SmartGateway system 600 with screening client is shown. The SmartGateway system consists of two pillars 602, 604 with one of them having an integrated camera 606 and display screen 608. On the back of the pillars 602, 604 may be a guard screen (not shown). Nearby would be a divestment table 610 in proximity to a screening kiosk 612 (i.e., tablet) which displays the Pass and Alert states 614.

Figure 7:
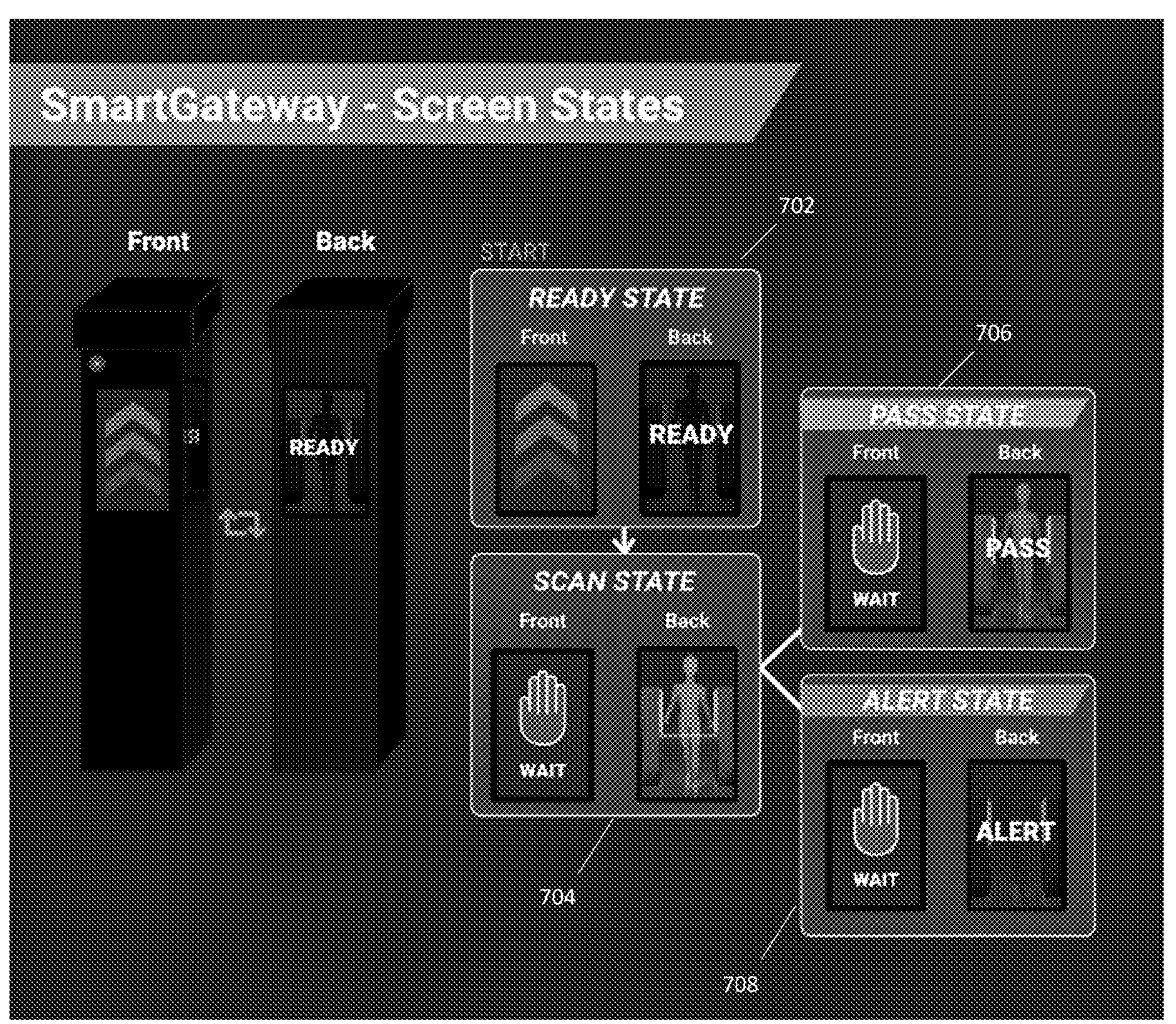
FIG. 7 is a diagram of illustrating a SmartGateway screen states.

FIG. 7 is a diagram illustrating a SmartGateway screen states. According to FIG. 7, the pillars of the SmartGateway may display a number of states on the front and/or back of the pillars, including a ready state 702, a scan state 704, a pass state 706 and an alert state 708. The different screen states will display large icons/images to illustrate the different alerts. Furthermore, bright lights, colours and audio notifications (i.e., sirens) may also be used to provide further alerts.

Figure 8:
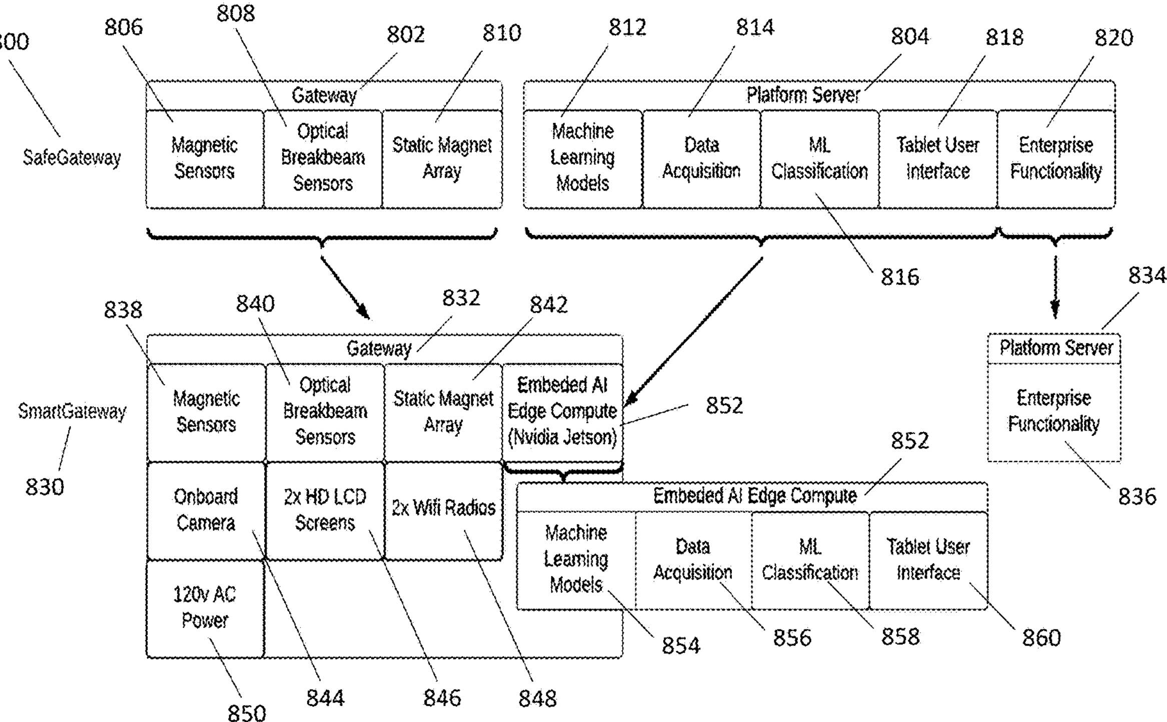
FIG. 8 is a diagram of illustrating a SmartGateway and SafeGateway features comparison.

FIG. 8 is a diagram illustrating a SmartGateway and SafeGateway features comparison. According to FIG. 8, a SafeGateway system 800 comprises a gateway 802 and a platform server 804. Within the gateway 802, a plurality of sensors such as magnetic sensors 806, optical breakbeam sensors 808 and static magnetic array sensors 810 can be found.

According to FIG. 8, the platform server 804 of SafeGateway 800 comprises machine learning models 812, data acquisition modules 814, machine learning (ML) classification modules 816, tablet user interface 818 and enterprise functionality modules 820.

According to FIG. 8, the SmartGateway system 830 also comprises a gateway 832 and a platform server 834. The platform server 834 provides for enterprise functionality 836. The gateway of the SmartGateway 830 comprises a plurality of sensors including magnetic sensors 838, optical breakbeam sensors 840, static magnetic array sensors 842, onboard camera 844, HD LCD screens 846, Wi-Fi® radios 848 and 120V AC power 850 and an embedded AI edge computer 852. The embedded AI edge compute module 852 (e.g., Nvidia Jetson) further comprises machine learning models 854, data acquisition modules 856, ML classification modules 858, and a tablet user interface 860.

Figure 9:
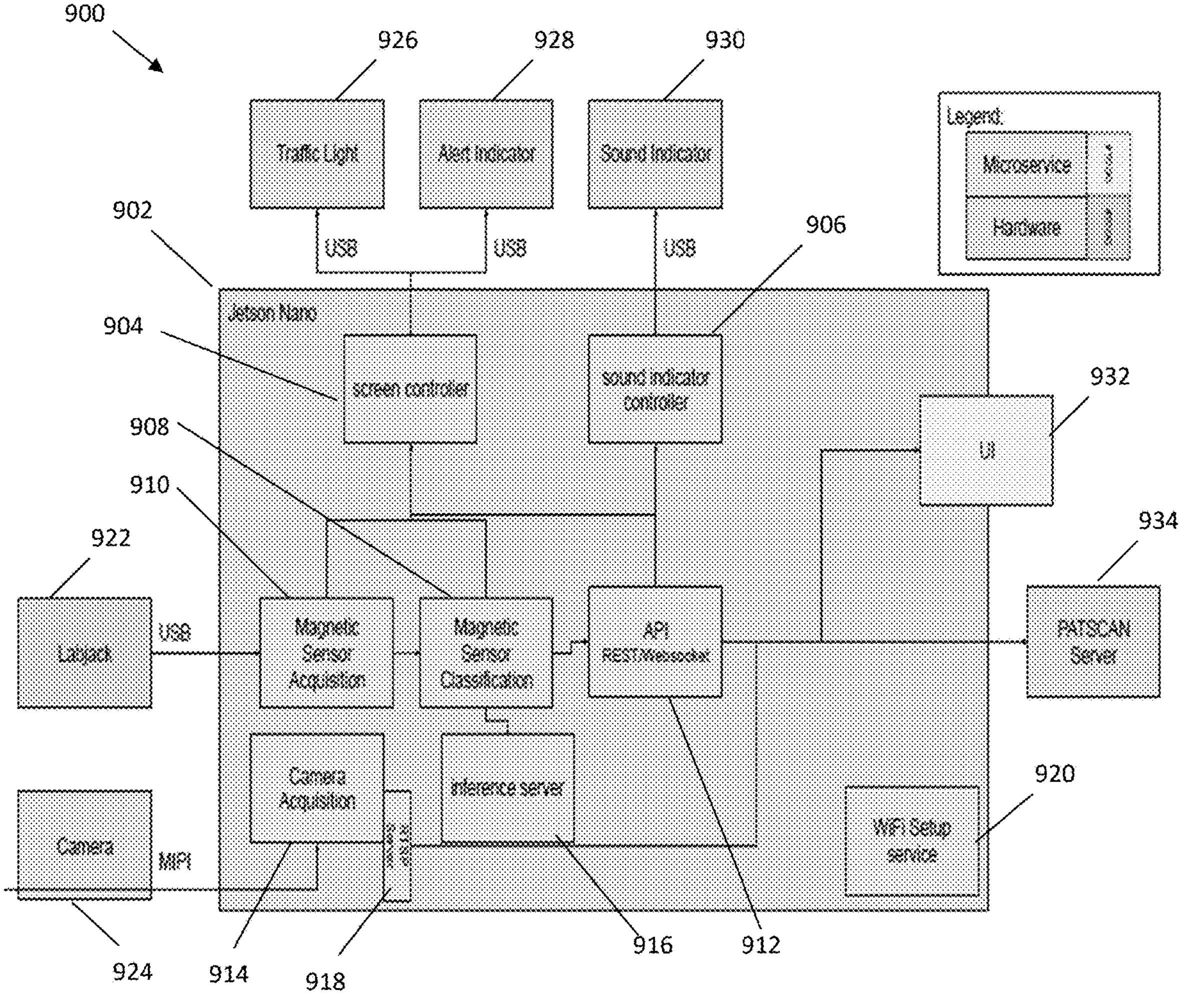
FIG. 9 is a hardware and software block diagram illustrating micro-services.

FIG. 9 is a hardware and software block diagram illustrating micro-services. According to FIG. 9, system 900 has an onboard processor 902 (e.g., Nvidia Jetson) including such components as screen controller 904, sound indicator controller 906, magnetic sensor acquisition module 908, magnetic sensor classification module 910, REST/websockets API 912, camera acquisition module 914, inference server 916, RTSP server 918 and a Wi-Fi Setup service 920. The onboard processor is connected to input and outputs (via USB, Ethernet or wirelessly) including Labjack 922, cameras 924, traffic lights 926, alert indicators 928, sound indicators 930. Furthermore, the onboard processor is also connected to a user interface (UI) 932 and a gateway detection system such as a PATSCAN server 934.

According to FIG. 9, the onboard processor (e.g., Nvidia Jetson) utilizes a micro-services architecture. A breakdown of the micro-services architecture is as follows:

- Magnetic Sensor Acquisition Service: The classification service takes in data from a LabJack T7 via USB and formats it together for the classifier to use.
- Magnetic Sensor Classification Service: The classification service takes in data from acquisition and classifies the data using the inference server. It then sends the results.
- Inference Server Service: The Triton Inference Server is used by classification services to perform inference with AI models. Data is sent thru GRPC, and results are returned to the classifier.
- Screen Controller Service: Controls the traffic light and alert indicator based on information from acquisition and classifier, as well as user input from the API.
- Sound Indicator Controller Service: Controls the speakers based on information from acquisition and classifier, as well as user input from the API.
- Camera Acquisition Service: A Deepstream/gstreamer based service that takes in data from a CSI camera and re-transmits it for PATSCAN via RTSP and strips out JPEG frames and saves them to disk.
- API Service: A service that provides endpoints for control from the UI.

According to aspects of this disclosure, the latency of this disclosure is lower than earlier disclosures. Furthermore, this disclosure contains displays to control patron flow and indicate alert information such as location of threat on body.

Figure 10:
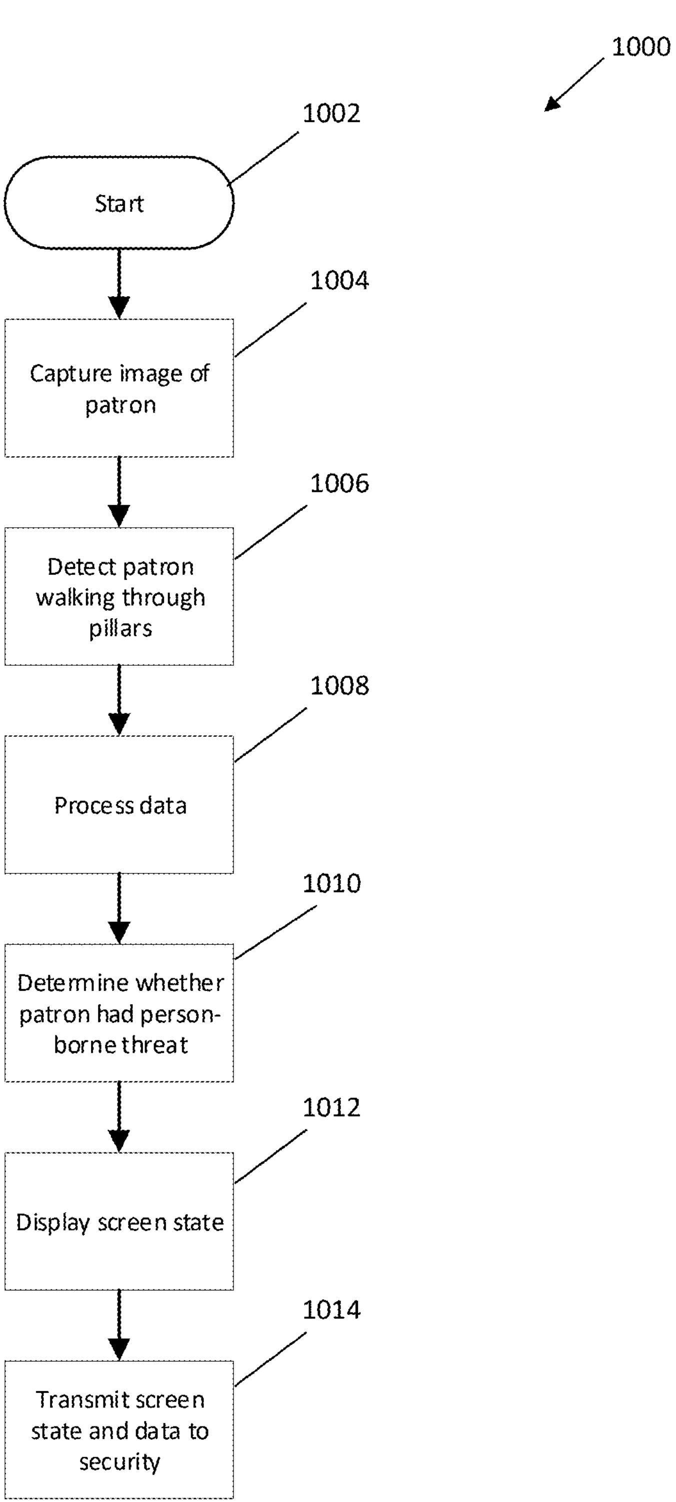
FIG. 10 is a diagram illustrating an exemplary process workflow for detecting person-borne threats

FIG. 10 is a diagram illustrating an exemplary process workflow for detecting person-borne threats. According to FIG. 10, multi-sensor gateway system 1000 initiates the workflow at step 1002. The first step is to capture an image of a patron or person at step 1004. Next, multi-sensor gateway system 1000 detects whether a patron walks through the pillars at step 1006.

According to FIG. 10, the next step is to process the data at step 1008. Thereafter, multi-sensor gateway system 1000 determines whether the patron has a person-borne threat 1010. A person-borne threat may be defined as wielding a weapon such as a gun, knife, bat, or other dangerous items that can be deemed as weapons.

According to FIG. 10, the next step is to display the screen state at step 1012. Finally, multi-sensor gateway system 1000 then transmits the screen state and data to security at step 1014.

According to the disclosure, a stand-alone multi-sensor gateway system for detection of a person-borne threat is disclosed. The multi-sensor gateway system comprises a first pillar having a plurality of first sensors, a second pillar having a plurality of second sensors, an integrated camera on the first or second pillar, a Wi-Fi® module on the first pillar configured for the pillars to communicate over Wi-Fi®, a display screen on the first pillar or second pillar for displaying a plurality of screen states, and a platform computer server and processor configured to receive data and process the data. The sensors of the first and second pillars detect the person-borne threat and instructs the display screen to display a screen state.

According to the disclosure, the person-borne threat of the multi-sensor gateway system further comprises detection of weapon consisting of a knife, gun and bat. The plurality of first and second sensors selected form list consisting of a magnetic sensor, an optical break-beam sensor and a static magnet array sensor. The multi-sensor gateway further comprising a power supply.

According to the disclosure, the platform server and processor of the multi-sensor gateway system further comprises processing modules selected from a list consisting of machine learning models, data acquisition module, ML classification module, table user interface and enterprise functionality modules.

According to the disclosure, the screen kiosk consists of a tablet and configured to display the screen state. The screen state is selected from a list consisting of a ready state, a scan state, a pass state and an alert state. The screen state further comprises displaying different images and icons on the first and second pillar providing information on the screening status.

According to the disclosure, the multi-sensor gateway system further comprises a divestment table for patrons to place items for security to check. The multi-sensor gateway system further comprising a guard display screen on back side of first or second pillar. According to the disclosure, the person borne-threat is detected, an alert or notification is sent to security and an alarm is triggered.

According to the disclosure, artificial intelligence (AI) analysis and processing is performed on edge device on the multi-sensor gateway. The multi-sensor gateway further comprises enhanced sensing capability, configured to support cameras and accelerometer sensors.

According to the disclosure, a method of detecting person-borne threats using a stand-alone multi-sensor gateway system is disclosed. The method comprises the steps of providing a first pillar having a plurality of first sensors, providing a second pillar having a plurality of second sensors, providing an integrated camera on the first or second pillar, providing a Wi-Fi® module on the first pillar configured for the pillars to communicate over Wi-Fi®, providing a display screen on the first pillar or second pillar for displaying a plurality of screen states and providing a platform computer server and processor configured to receive data and process the data.

According to the disclosure, the method comprises the steps of capturing an image of the patron, detecting a threat by analyzing data from the plurality of first and second sensors when a patron walks through the first and second pillar, computing the data using the computer server and processor and processing the data, scanning for person-borne threats on the patron, displaying a screen state on the first and second pillar and transmitting the screen state and analyzed data to operations and security personnel.

According to the disclosure, the method further comprising the step of instructing patron to a divestment table to divest objects after walking through first and second pillars. The method further comprising the step of instructing patron to a screen kiosk and capturing additional image of patron and displaying screen state on screening kiosk.

According to the disclosure, the screen state is selected from a list consisting of a ready state, a scan state, a pass state and an alert state. The screen state further comprises displaying different images and icons on the first and second pillar providing information on the screening status.

According to the disclosure, the platform server and processor of the method further comprises processing modules selected from a list consisting of machine learning models, data acquisition module, ML classification module, table user interface and enterprise functionality modules. The method further comprising an artificial intelligence (AI) analysis and processing is performed on edge device on the multi-sensor gateway. The multi-sensor gateway of the method further comprises enhanced sensing capability, configured to support cameras and accelerometer sensors.

According to the disclosure, the person-borne threat of the method further comprises detection of weapon consisting of a knife, gun and bat. The plurality of first and second sensors selected form list consisting of a magnetic sensor, an optical break-beam sensor and a static magnet array sensor. The multi-sensor gateway of the method further comprising a power supply.

According to the disclosure, the method further comprises a divestment table for patrons to place items for security to check. The method further comprising a guard display screen on back side of first or second pillar. According to the disclosure, once the person borne-threat of the method is detected, an alert or notification is sent to security and an alarm is triggered.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor. A "module" can be considered as a processor executing computer-readable code.

A processor as described herein can be a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, or microcontroller, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. In some embodiments, a processor can be a graphics processing unit (GPU). The parallel processing capabilities of GPUs can reduce the amount of time for training and using neural networks (and other machine learning models) compared to central processing units (CPUs). In some embodiments, a processor can be an ASIC including dedicated machine learning circuitry custom-build for one or both of model training and model inference.

The disclosed or illustrated tasks can be distributed across multiple processors or computing devices of a computer system, including computing devices that are geographically distributed. The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on." While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claimed is:

1. A stand-alone multi-sensor gateway system for detection of a person-borne threat comprising:

a first pillar and a second pillar spaced apart to define a passageway;

a plurality of first sensors on the first pillar and a plurality of second sensors on the second pillar, the sensors including at least one magnetic sensor and at least one optical break-beam sensor;

an integrated camera mounted on at least one of the pillars;

a Wi-Fi® module on at least one of the pillars, configured for peer-to-peer wireless communication between the pillars;

a display screen mounted on the first pillar and a second display screen mounted on the second pillar, wherein:

the first display screen is configured to face incoming patrons and display a screen state selected from a group consisting of: a READY state, a SCAN state, a PASS state, and an ALERT state; and the second display screen is configured to face security personnel and display alert information including a visual indication of a detected threat;

an edge computing device housed within one of the pillars, comprising a processor configured to:

receive sensor and camera data;

perform threat detection using embedded artificial intelligence models locally, without reliance on a remote server;

trigger a change in the screen state based on the threat detection result; and transmit alert data wirelessly to a security system.

2. The system of claim 1 wherein the person-borne threat further comprises detection of weapon consisting of a knife, gun and bat.

3. The system of claim 1 wherein the plurality of first and second sensors selected form list consisting of a magnetic sensor, an optical break-beam sensor and a static magnet array sensor.

4. The system of claim 1 wherein the multi-sensor gateway further comprising a power supply.

5. The system of claim 1 wherein the platform server and processor further comprises processing modules selected from a list consisting of machine learning models, data acquisition module, ML classification module, table user interface and enterprise functionality modules.

6. The system of claim 1 further comprising a screen kiosk, the screen kiosk consisting of a tablet and configured to display the screen state.

7. The system of claim 1 wherein the screen state further comprises displaying different images and icons on the first and second pillar providing information on the screening status.

8. The system of claim 1 further comprising a divestment table for patrons to place items for security to check.

9. The system of claim 1 wherein when the person borne-threat is detected, an alert or notification is sent to security and an alarm is triggered.

10. The system of claim 1 wherein artificial intelligence (AI) analysis and processing is performed on edge device on the multi-sensor gateway.

11. The system of claim 1 wherein the multi-sensor gateway further comprises enhanced sensing capability, configured to support cameras and accelerometer sensors.

12. The system of claim 1 wherein artificial intelligence (AI) analysis and processing is performed on edge device on the multi-sensor gateway.

13. The system of claim 1 wherein the multi-sensor gateway further comprises enhanced sensing capability, configured to support cameras and accelerometer sensors.

14. The system of claim 1, wherein the second display screen includes a human avatar visualization indicating the approximate location of the detected threat on the patron's body.

15. The system of claim 1, further comprising an audible alert mechanism configured to emit different tones based on severity level of the detected threat.

16. The system of claim 1, wherein the sensors are calibrated to define at least three vertical detection zones corresponding to different body regions.

17. The system of claim 1, wherein the edge computing device is further configured to calculate and display a throughput efficiency score based on patron processing time.

18. A method of detecting person-borne threats using a stand-alone multi-sensor gateway system, the method comprising the steps of:

providing a first pillar and a second pillar spaced apart to define a passageway;

providing a plurality of first sensors on the first pillar and a plurality of second sensors on the second pillar, the sensors including at least one magnetic sensor and at least one optical break-beam sensor;

providing an integrated camera on the first or second pillar;

providing a Wi-Fi® module on the first pillar configured for the pillars to communicate over Wi-Fi®;

providing a display screen on the first pillar and second pillar for displaying a plurality of screen states wherein:

the first display screen is configured to face incoming patrons and display a screen state selected from a group consisting of: a READY state, a SCAN state, a PASS state, and an ALERT state; and the second display screen is configured to face security personnel and display alert information including a visual indication of a detected threat;

an edge computing device housed within one of the pillars, comprising a processor configured to:

receive sensor and camera data;

perform threat detection using embedded artificial intelligence models locally, without reliance on a remote server;

trigger a change in the screen state based on the threat detection result; and transmit alert data wirelessly to a security system.

19. The method of claim 18 further comprising the step of instructing patron to a divestment table to divest objects after walking through first and second pillars.

20. The method of claim 18 further comprising the step of instructing patron to a screen kiosk and capturing additional image of patron and displaying screen state on screening kiosk.

21. The system of claim 18 wherein the platform server and processor further comprises processing modules selected from a list consisting of machine learning models, data acquisition module, ML classification module, table user interface and enterprise functionality modules.

* * * * *